United States Patent [19]

Balchin

[11] 4,318,151
[45] Mar. 2, 1982

[54] EARTH LEAKAGE PROTECTION DEVICES

[75] Inventor: David J. Balchin, Kenton, England

[73] Assignee: Trident Equipment Limited, Ware, England

[21] Appl. No.: 154,258

[22] Filed: May 29, 1980

[30] Foreign Application Priority Data

May 29, 1979 [GB] United Kingdom ............... 18540/79

[51] Int. Cl.³ ............................................. H02H 3/16
[52] U.S. Cl. ........................................ 361/45; 363/125
[58] Field of Search ....................... 361/45, 44, 46, 59; 324/51; 363/125, 13

[56] References Cited

U.S. PATENT DOCUMENTS 3,512,045  5/1970  Tipton et al. .......................... 361/44
3,786,356  1/1974  MacPhee .............................. 361/45
4,135,129  1/1979  Johnston et al. ...................... 324/51

OTHER PUBLICATIONS

Electronics, vol. 47, No. 16, pp. 104–105, Aug. 8, 1974, "Full Wave Rectifier Needs Only Three Matched Resistors", J. Graeme.
New Electronics, vol. 12, No. 9, p. 8, May 1, 1979, "Wide Range Full-Wave Rectifier", Donoghue.

*Primary Examiner*—Reinhard J. Eisenzopf
*Attorney, Agent, or Firm*—Sughrue, Mion, Zinn, Macpeak and Seas

[57] ABSTRACT

An earth leakage protection device comprises a core balance current sensing transformer 1 having a secondary winding 2 in which a fault signal is generated in response to leakage from AC supply lines forming primary windings of the transformer 1, an operational amplifier OA1 for amplifying the fault signal, a precision rectifier circuit 8 comprising a pair of operational amplifiers OA2 and OA3 for performing full wave rectification of the amplified fault signal, a delay circuit 9 in the form of a two stage RC network which delays the rectified signal according to an IDMT characteristic, and a trigger circuit 10 in which the delayed signal is compared with a preset reference signal by an operational amplifier OA4 to provide a control signal which actuates a sagety device in the AC supply lines via a relay 11 when the reference signal is exceeded. Within its operating range the device actuates the safety device much more slowly for lower leakage currents than for higher currents, and since it is operative on both halves of the AC leakage current signal the device provides reliable protection against the possibility of dangerous electric shocks while avoiding spurious tripping.

10 Claims, 4 Drawing Figures

EARTH LEAKAGE PROTECTION DEVICES

This invention relates to earth leakage protection devices, i.e. devices which are designed to detect an earth leakage current in power supply lines leading between an AC electrical power source and a load, and to operate a safety device, such as a circuit breaker, in the supply lines upon detection of an earth leakage current.

In recent years a large number of such devices have been developed, and in many cases a core balance sensing transformer is used to detect the earth leakage current, the power supply lines being passed through the transformer core to form primary windings of the transformer so that any imbalance in the currents flowing in the supply lines, such as would occur as a result of an earth leak, induces a current signal in a secondary winding of the transformer. Usually an amplifier circuit is provided to amplify any signal induced in the secondary winding of the core balance transformer and to control the operation of the safety device, often through a relay. One of the main problems with earth leakage protection devices of this type is the difficulty of making the device sufficiently sensitive to provide a high level of human life protection against electric shocks, at least at the current levels likely to be used in most types of portable electric equipment, while avoiding to a large extent unwanted spurious tripping of the safety device such as may be caused by switching transients in the circuit being monitored.

With the aim of overcoming this problem in a simple and compact manner, according to the present invention, an earth leakage protection device comprises a core balance current sensing transformer having a secondary winding through which a current is caused to flow in response to an imbalance between the currents flowing through AC supply lines which, in use, extend through the transformer core and constitute primary windings of the transformer, an amplifier for amplifying the signal from the secondary winding of the core balance transformer, a precision rectifier circuit for performing full wave rectification of the amplified signal, delay means coupled to receive the rectified signal and possessing an IDMT characteristic, and a trigger circuit for actuating a safety device in the supply line in response to a signal of a predetermined magnitude from the delay means.

The term IDMT (inverse definite minimum time) characteristic in the present context means that, within set limits, the delay means reproduces the signal from the precision rectifier, provided the signal is maintained, in a time which is inversely related, usually exponentially, to the strength of the signal, which in turn is related to the strength of the earth leakage current sensed by the secondary winding of the core balance transformer. In other words, the response time of the device in accordance with the invention varies inversely in proportion to the strength of the fault signal generated by the core balance transformer, and the device has a definite minimum response time. The IDMT characteristic of the device enables the device to maintain a sensitivity consistent with providing full human life protection against earth leakage faults while minimizing spurious tripping.

The delay means preferably comprises a filter and limiter circuit in the form of an RC circuit, and the trigger circuit preferably comprises a comparator which is arranged to compare the signal from the filter and limiter circuit with a preset reference signal and to provide a control signal when the reference signal is exceeded. Usually the control signal from the comparator will be arranged to operate a relay which forms part of the device and which, in use, is connected so as to actuate the safety device in the supply lines being monitored by the earth leakage protection device in accordance with the invention.

Preferably the precision rectifier circuit comprises a pair of operational amplifiers, and in a preferred embodiment these are of the differential input and single ended output type and have their phase inverting inputs connected in common, the output of one being coupled to the non phase inverting input of the other through a diode. Preferably the comparator and the earth leakage current signal amplifier also comprise operational amplifiers, and it will be convenient to combine these amplifiers with the two operational amplifiers of the precision rectifier in the form of a quad-operational amplifier integrated circuit.

With the construction in accordance with the invention, an earth leakage protection device can be designed having high sensitivity and an operating time/sensitivity curve which is well within the limits of zone 2 as laid down by the IEC document 479. Within this zone there is usually no pathophysiologically dangerous effect to a human being from an electric shock received from an AC 50/60 Hz supply, and is a recognized safety standard. For example, a device in accordance with the invention can be designed to give full human life protection against earth leakage shocks and having operating time/sensitivity characteristics of 10 milliamps in 250 milliseconds, 20 milliamps in 100 milliseconds, and 250 milliamps in 12 milliseconds. The response time of 12 milliseconds to an earth leakage current of 250 milliamps leads to a minimum reaction time of about 14 milliseconds for the relay of the device, and since the conventional safety devices which will be operated by the relay, for example contactor or circuit breaker shunt trips or under voltage releases, have a response time of about 15 to 20 milliseconds, the total minimum reaction time for rendering the detected fault safe is approximately 30 milliseconds. This is within the safe area defined by zone 2 of IEC 479.

The sensitivity of the device in accordance with the invention may be increased simply by passing the monitored supply lines through the core balance transformer several times instead of once only, the maximum sensitivity then being increased to the original maximum sensitivity in milliamps divided by the number of turns. On the other hand, the sensitivity of the device may be decreased, if desired, by fitting an external resistor of the required value. This will be done, for example, if the device is to be used for plant protection where the protection sensitivity required is less.

The device in accordance with the invention may be arranged to reset automatically after it has been triggered, but if preferred a remote push button may be provided so that resetting is controlled manually.

The device in accordance with the invention preferably also includes a test winding on the core balance transformer, the winding being activated, upon closure of a switch, by a suitable power supply which will cause a current to flow through the test winding and simulate an earth fault for detection by the device. The power supply for the test winding will conveniently be taken from the power circuit which will be provided for supplying the operational components of the device, the power circuit being supplied from the mains or some other suitable AC supply via an isolating transformer.

A preferred example of the device in accordance with the invention is illustrated in the accompanying drawings, in which.

Figure 1:
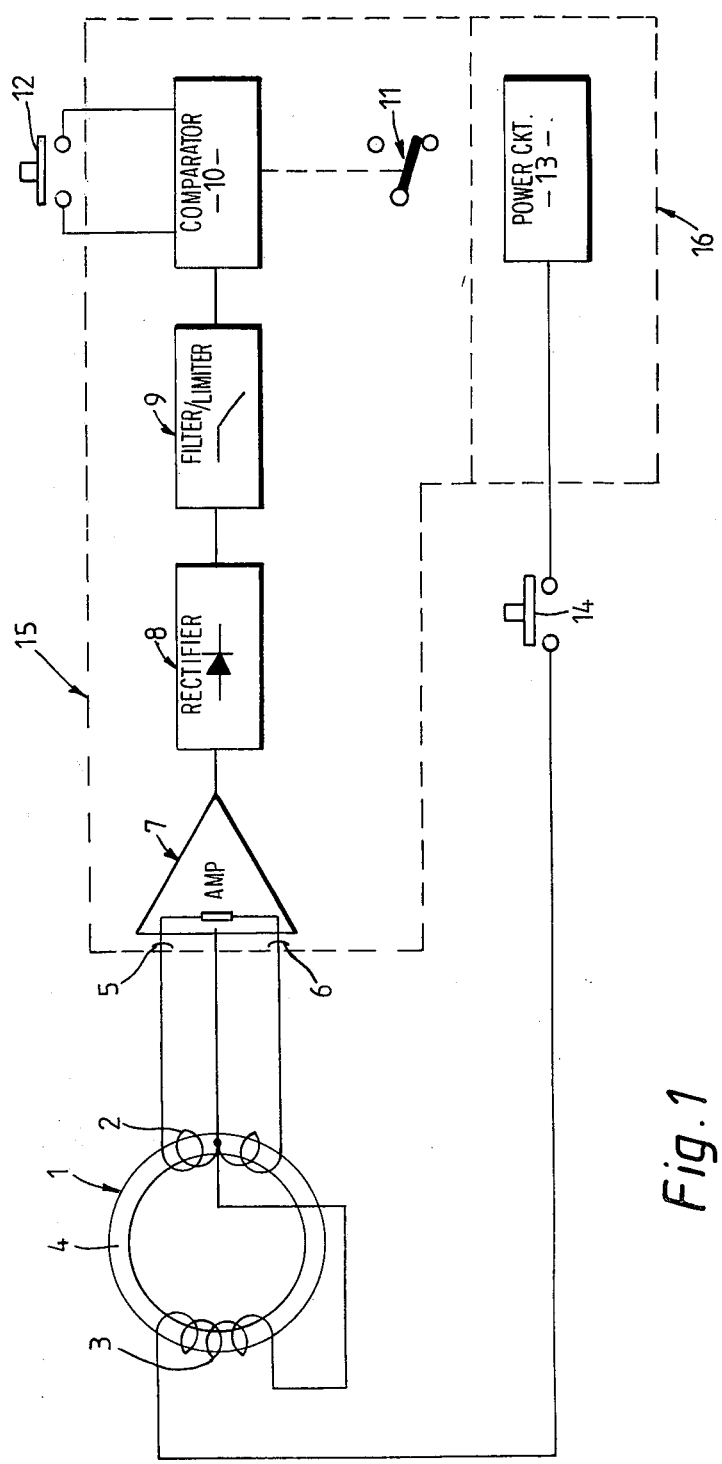
FIG. 1 is a schematic block diagram of the device.

With reference to FIG. 1, the device comprises a core balance current sensing transformer 1 having a secondary sensing winding 2 and a secondary test winding 3 wound on the core 4. The primary windings of the transformer are not shown, but will be provided by the AC power supply lines (for either single or polyphase supplies) which are to be monitored for earth leakage faults and which will be passed through the core 4. Any imbalance in the currents flowing through the supply lines constituting the primary windings will be detected by the secondary winding 2, causing an AC signal proportional to the magnitude of the detected imbalance to be applied across the input terminals 5 and 6 of an amplifier circuit 7. The output from the amplifier circuit 7 is then processed through a precision rectifier circuit 8, a filter and limiter circuit 9, and a comparator circuit 10 to actuate a relay 11 which is arranged to operate a remote circuit breaker (not shown) or other similar safety device in the supply lines being monitored. A reset button 12 operating a reset circuit in conjunction with the comparator 10 is provided for resetting the relay 11 after it has been tripped. For test purposes, the device can also be made to operate in response to a current which is caused to flow through the test winding 3 by a power circuit 13 when a test switch 14 is closed. The construction and operation of the device is illustrated in more detail in FIGS. 2 and 3 which show circuit diagrams of the parts of the device encompassed by the boxes 15 and 16 respectively in FIG. 1.

Figure 2:
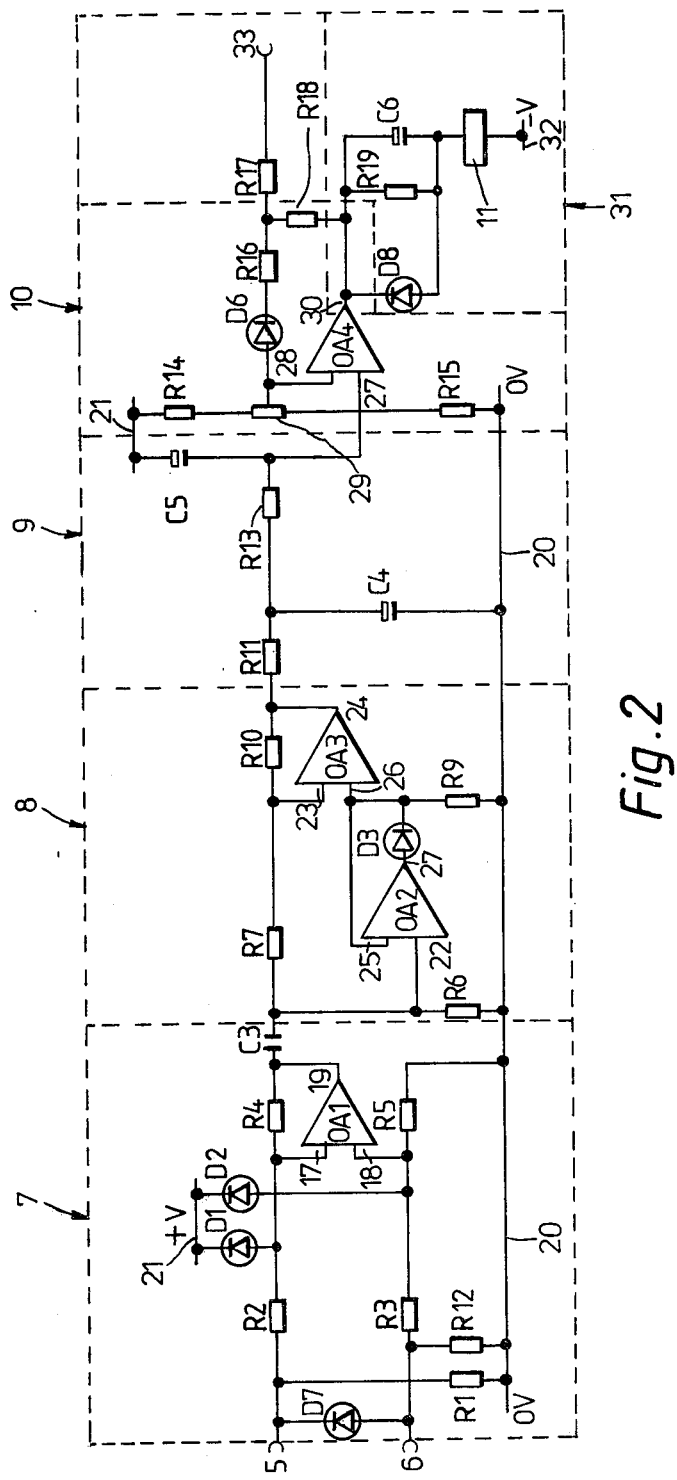
FIG. 2 is a circuit diagram of part of the device shown in FIG. 1.

With reference to FIG. 2, the terminals 5 and 6 receive the input to the amplifier circuit 7, and as explained earlier the output from the detector winding 2 of the core balance transformer 1 is applied across the terminals 5 and 6. The amplifier circuit 7 comprises an operational amplifier OA1, and the terminals 5 and 6 are coupled to the phase inverting and non-phase inverting inputs 17 and 18 respectively of the amplifier OA1 through resistors R2 and R3. The output 19 of the amplifier OA1 is applied to the precision rectifier circuit 8 through a capacitor C3. A Zener diode D7 is connected across the input terminals 5 and 6 to limit the differential input voltages which would otherwise be excessive during heavy current conditions, and resistors R1 and R12 connected between the input lines and a zero voltage line 20 provide a balanced earth condition for the input to the amplifier OA1. Diodes D1 and D2 connected between the input lines and a constant positive potential power line 21 protect the amplifier from high common mode fault voltages, and R4 and R5 isolate the inputs to the amplifier OA1 from the rest of the circuit.

The precision rectifier circuit 8 which receives the oscillating output from the amplifier circuit 7 comprises a pair of operational amplifiers OA2 and OA3, the signal from the capacitor C3 being fed to the phase inverting inputs 22 and 23 of the amplifiers OA2 and OA3 respectively. The input 22 is also connected to the earth line 20 through a resistor R6, and the input 23 is coupled to the output 24 of the amplifier OA3 through a feedback resistor R10. The non-phase inverting inputs 25 and 26 of the amplifiers OA2 and OA3 are connected together and also to the earth line 20 through a resistor R9. The output 27 of the amplifier OA2 is coupled through a diode D3 to the input 26, and the output 24 of the amplifier OA3 is applied to the filter and limiter circuit 9. With this arrangement the output 24 from the amplifier OA3 will increase both when the signal from the capacitor C3 increases and when it decreases, and the rectifier circuit 8 thus provides full wave rectification of the output from the amplifier circuit 7. Furthermore, the rectifier circuit 8 operates with substantially linear characteristics, substantially no loss, and substantially independently of temperature variations.

The filter and limiter circuit 9 which receives the full wave amplified fault signal from the rectifier circuit 8 comprises a two stage RC network, the first stage being formed by a resistor R11 and a capacitor C4 connected between the zero voltage line 20 and the output side of the resistor R11, and the second stage being formed by a resistor R13 and a capacitor C5 connected between the positive power line 21 and the output side of the resistor R13. This two stage RC network effectively delays the transmission of the output from the rectifier circuit 8 to the comparator circuit 10 with an IDMT characteristic as hereinbefore defined.

The comparator circuit 10 comprises an operational amplifier OA4 which receives the output from the filter and limiter circuit 9 at its non-phase inverting input 27. The inverting input 28 of the amplifier OA4 is connected to receive a preset reference signal from a potentiometer 29 connected between potential dividing resistors R14 and R15 which are respectively connected to the positive potential line 21 and the zero volt line 20. The output 30 from the amplifier OA4 is applied to a relay circuit 31 comprising a pulse capacitor C6, a resistor R19, and a diode D8 coupled as shown, and the relay 11 which is connected to a negative potential power line 32. When a fault signal applied to the input 27 of the amplifier OA4 exceeds the reference signal applied to the input 28, the output signal applied to the relay circuit 31 trips the relay 11 to operate the remote circuit breaker. Consequently the value of the reference signal applied to the input 28 from the potentiometer 29 determines when the relay 11 is triggered. The potentiometer 29 can be preset as desired, and can to used to compensate effectively for tolerances in other parts of the device.

Figure 3:
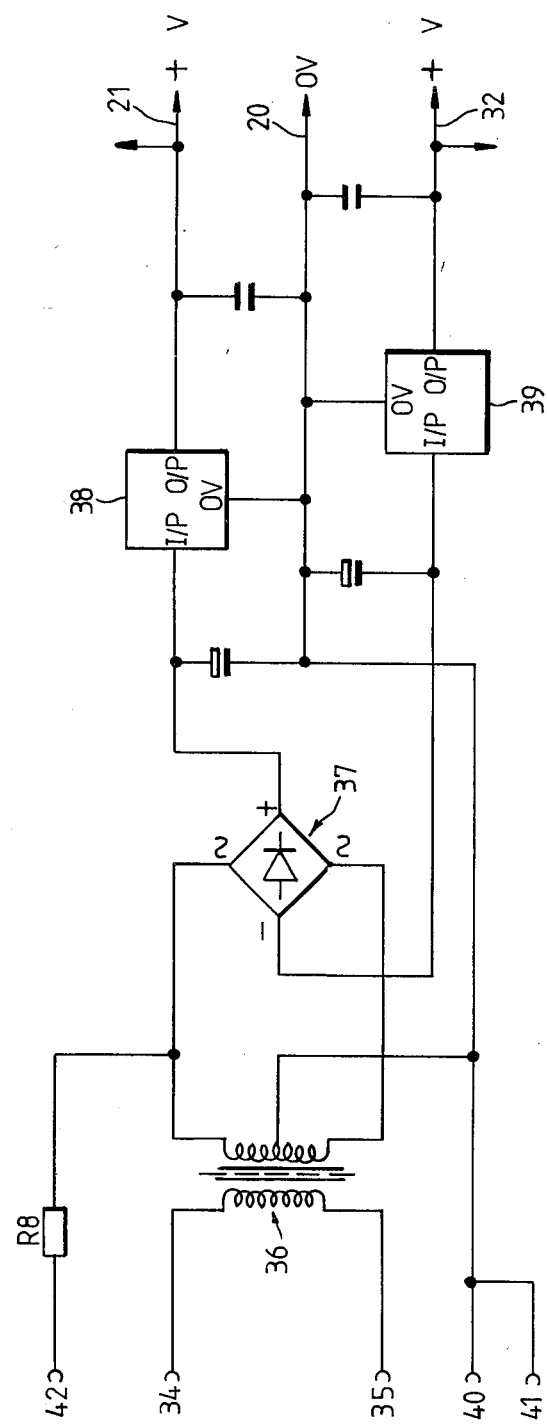
FIG. 3 is a circuit diagram of another part of the device shown in FIG. 1.

The negative feed back loop of the operational amplifier OA4 contains a diode D6 and resistors R16 and R18, and these components together with a further resistor R17 form a reset circuit which is arranged so that when a terminal 33 of the circuit is connected to the zero volt line 20 the relay 11 is automatically reset when there is no fault signal applied to the amplifier input 27. When the terminal 33 is open, the relay, once released, will remain so. If the reset circuit is to be controlled manually, the reset switch 12 shown in FIG. 1 will be located in the connection between the terminal 33 and the zero volt line 20. FIG. 3 illustrates a circuit diagram of the power circuit 13 shown in FIG. 1, the circuit providing power not only for the test winding 3 of the core balance transformer 1, but also energizing the positive and negative potential power lines 21 and 32 relative to the zero volt line 20 referred to in FIG. 2. In operation, mains electricity is supplied to the power circuit via input terminals 34 and 35 and is applied via an isolating transformer 36 to a rectifier bridge 37. The output from the bridge 37 energizes the fixed potential positive and negative lines 21 and 32 through voltage regulators 38 and 29 respectively which also serve to control the zero volt line 20. The line 20 may be connected to earth at terminals 40 and 41 and the power for the test winding 3 of the core balance transformer is provided at a terminal 42 via a resistor R8.

Figure 4:
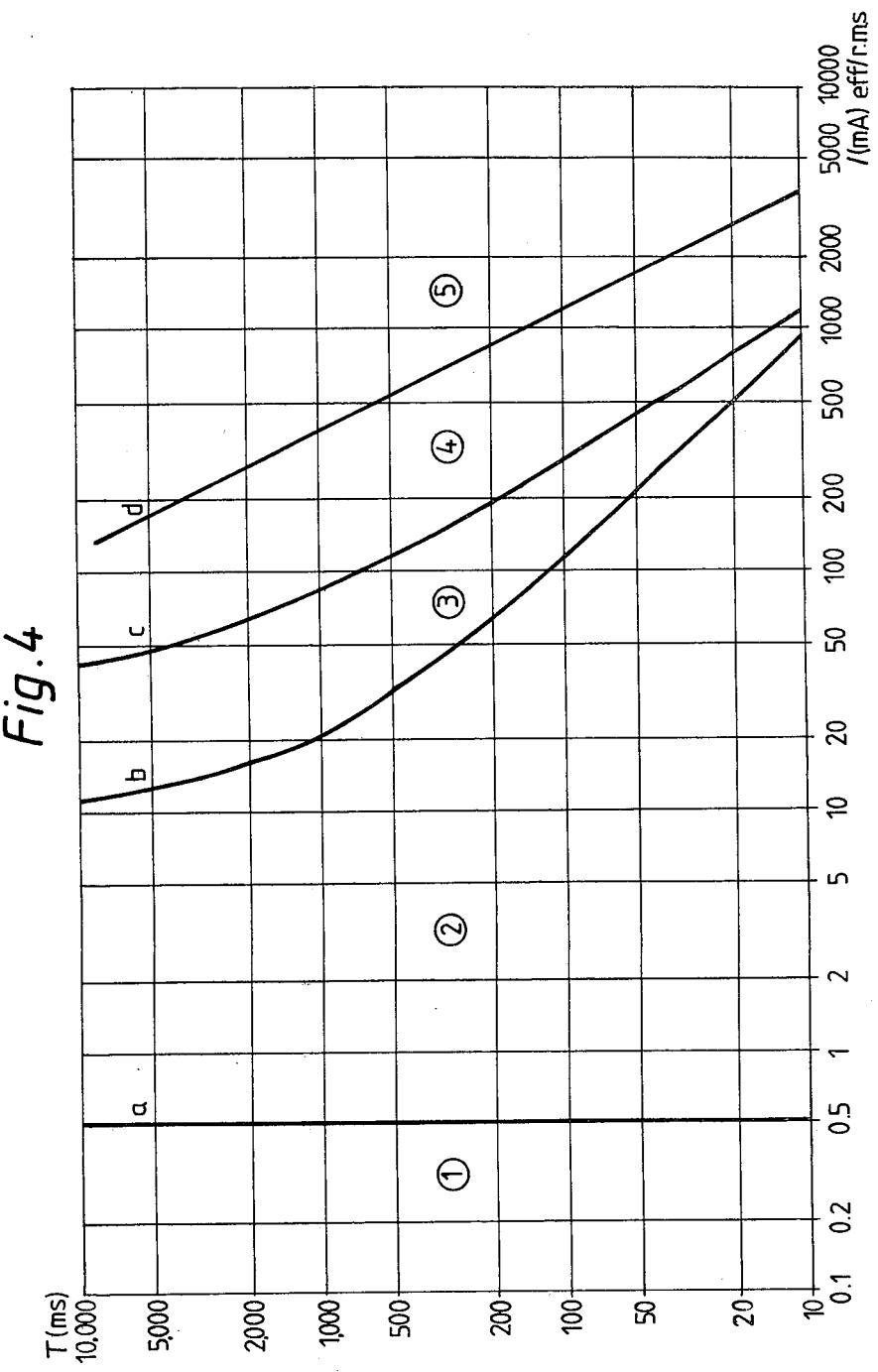
FIG. 4 is a diagram reproducing appendix A of IEC document 479

An earth leakage protection device constructed as described with reference to FIGS. 1 to 3 can be designed having operating time/sensitivity characteristics of 10 milliamps in 250 milliseconds, 20 milliamps in 100 milliseconds, and 250 milliamps in 12 milliseconds. Such response times added to the reaction time of the relay 11 and the remote circuit breaker give a total response time for the device which is well within the safe area of zone 2 as defined by the IEC document 479. FIG. 4 reproduces appendix A of this document which plots electric current in milliamps against time in milliseconds to give an indication of human reaction to varying degrees of electric shock from an AC 50/60 Hz source, assuming a body weight of at least 50 kg and a current path through the extremities. Under these conditions no reaction may be expected in zone 1. In zone 2, a reaction may occur, but usually no pathophysiologically dangerous effects may be expected. In zone 3 there will be a reaction but usually no risk of ventricular fibrillation, whereas in zone 4 such a risk does exist. Finally, in zone 5 the onset of ventricular fibrillation is probable. Furthermore, it is to be noted that in the case of longer durations of the current flow, in zone 3 and above there is a risk of asphyxia.

I claim:

1. An earth leakage protection device for use with the AC supply lines of an AC system, said device comprising a core balance current sensing transformer having a core and a secondary winding thereon through which a fault signal current is caused to flow in response to imbalance between the currents flowing through said AC supply lines which, in use, pass through said core of said transformer to constitute primary windings thereof, amplifier circuit means coupled to said secondary winding for amplifying said fault signal, precision rectifier circuit means coupled to said amplifier means for performing full wave rectification of said amplified signal, delay circuit means coupled to said rectifier circuit for delaying said signal in accordance with an inverse definite minimum time characteristic whereby said signal is reproduced in a minimum time or in a time which is inversely related to the strength of said signal, and trigger circuit means responsive to a signal of a predetermined magnitude from said delay circuit means to actuate a safety device in said AC supply lines, said precision rectifier circuit means comprising a pair of operational amplifiers of the differential input and single ended output type, said operational amplifiers having their non-phase inverting inputs connected in common, and the output of one of said operational amplifiers being coupled through a diode to the non-phase inverting input of said other operational amplifier.

2. A device as claimed in claim 1, wherein said delay circuit means comprises a filter and limiter circuit in the form of an RC circuit.

3. A device as claimed in claim 2, wherein said trigger circuit comprises means for providing a preset reference signal, and a comparator connected to compare said signal from said delay circuit means with said preset reference signal, said comparator providing a control signal when said reference signal is exceeded.

4. A device as claimed in claim 1, wherein said trigger circuit comprises means for providing a preset reference signal, and an operational amplifier connected to compare said signal from said delay circuit means with said preset reference signal to provide a control signal when said reference signal is exceeded.

5. A device as claimed in claim 4, wherein said trigger circuit includes a relay which trips in response to said control signal, said relay being connected whereby, when tripped, said safety device in said AC supply lines is actuated.

6. A device as claimed in claim 5, including means for automatic resetting said relay after said relay has tripped and when there is no longer a fault signal input to said comparator.

7. A device as claimed in claim 5, wherein said fault signal amplifier circuit comprises an operational amplifier, and said operational amplifier is combined with the operational amplifier of said trigger circuit and the two operational amplifiers of said precision rectifier circuit in the form of a quad-operational amplifier integrated circuit.

8. A device as claimed in claim 1, having an operating time/sensitivity characteristic of 10 milliamps in 250 milliseconds, 20 milliamps in 100 milliseconds, and 250 milliamps in 12 milliseconds.

9. A device as claimed in claim 1, including power circuit means for connection to an AC supply source and comprising an isolating transformer, rectifier means coupled to said transformer, and voltage regulator means coupled to said rectifier to provide positive and negative power lines at fixed potentials and a common zero voltage line from which said device is powered.

10. A device as claimed in claim 9, wherein said core balance transformer includes a test winding which is connected through a switch to said power circuit between said isolating transformer and said rectifier whereby, upon closure of said switch, a current will flow through said test winding to simulate an earth fault for detection by said device.

* * * * *